UNITED STATES PATENT OFFICE.

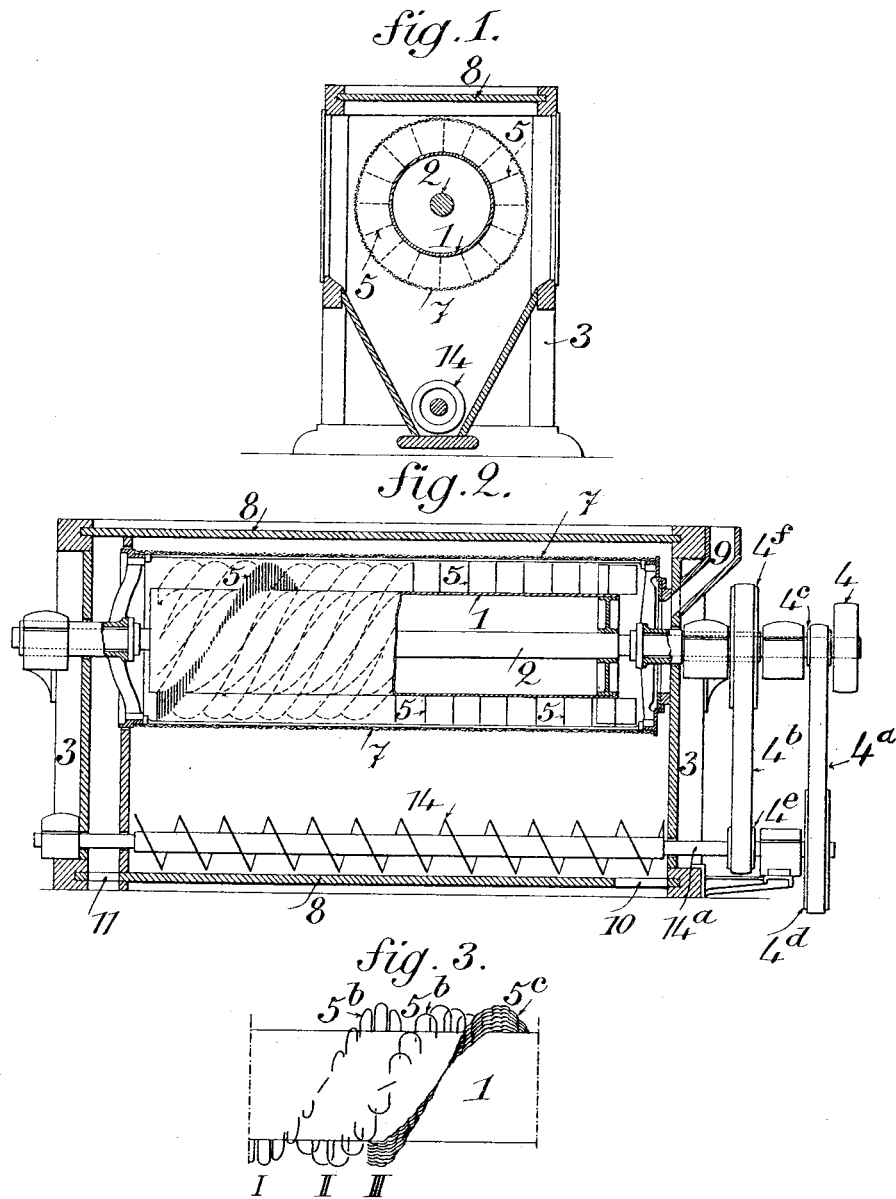

RAOUL BRIFFAUX, EUGÈNE BRISSON-DAUTHEL, AND AMÉDÉE GILLOT, OF BRIENNE-LE-CHATEAU, FRANCE.

MACHINE FOR TRITURATING OR BREAKING UP MATERIALS INTO SMALL PIECES OR POWDER.

1,176,646.   Specification of Letters Patent.   Patented Mar. 21, 1916.

Application filed July 19, 1912. Serial No. 710,409.

*To all whom it may concern:*

Be it known that we, RAOUL BRIFFAUX, EUGÈNE BRISSON-DAUTHEL, and AMÉDÉE GILLOT, citizens of the Republic of France, residing at Boulevard Napoléon, Brienne-le-Chateau, Aube, in the Republic of France, engineers, have invented certain new and useful Improvements in Machines for Triturating or Breaking Up Materials into Small Pieces or Powder, of which the following is a specification.

This invention relates to machines for triturating or breaking up materials into small pieces, or powder comprising, as triturating members, chains secured to a drum or revolving support moving within a receptacle either stationary or movable through which the flour or other grinding products are passed.

The invention consists in the peculiar arrangements of the triturating chains and the peculiar fitting up of a triturating or grinding machine of the specified character.

One embodiment of this invention is shown by way of example in the accompanying drawing, in which:—

Figures 1 and 2 are respectively a longitudinal and vertical section of a machine for bolting bran. Fig. 3 is a diagram showing different arrangements of chains on a revolving drum.

With reference to Figs. 1 and 2, the support of the chains consists of a horizontal drum 1 secured on an arbor 2 journaled in bearings carried by a main frame 3 and which receives its motion from a belt passing around a pulley 4 secured on the arbor 2 or in any other suitable manner.

To the periphery of the drum 1 are secured short chains 5 the fastening points of which are arranged along helical lines comparatively close to one another.

The sifter 7 of suitable fabric, such as silk, or the like, of cylindrical or polygonal shape, is placed around the drum 1; it is surrounded itself by a stationary casing 8. The drum, the sifter and the casing form between them intermediate concentric annular chambers at the ends of which are arranged inlets 9 for the products to be treated, outlets 10 for the fine products which have traversed the sifter and outlets 11 for the refuse. The sifter 7 revolves at a different speed from that of the drum; it is actuated by means of two belts $4^a$, $4^b$; the former $4^a$ passes around a pulley $4^c$ secured to the arbor 2 and a pulley $4^d$ secured to gear shaft $14^a$, while the belt $4^b$ passes around a pulley $4^e$ secured to such gear shaft and a pulley $4^f$ loosely mounted on the arbor 2 and coöperating with the sifter. Any other suitable gearing may be used instead of the one just described.

The shaft $14^a$ carries a creeper 14, located at the bottom of the casing 8 and which conveys the fine material to the outlet 10.

As shown in Figs. 1 and 2, each chain 5 is short and is only secured to the drum 1 by one of its ends. This arrangement is advantageous in that, if a chain is snapped, the sifter runs no risk of being damaged by the broken chain.

Fig. 3 shows other arrangements; at I and II the chains $5^b$ are secured to the drum by both ends thus forming bails or loops; the points at which the successive chains are fastened may be in line with each other (see I) or staggered (II); the chains may also be very close to each other and so united as to form coats of mail $5^c$ as shown at III. The employment of such coat of mail is particularly advantageous for certain triturating operations such as removing the points and beards, polishing, bolting and cleaning certain products. Again, the snapping of a link of the coat of mail is of no importance and cannot shorten the life of either the sifter or other enveloping surfaces.

Claims:

1. In combination, a perforated member; and flexible loops having an intermediate part disposed yieldably and parallel to the perforated member by the action of centrifugal force.

2. A machine for triturating or crushing materials, comprising a revolving support and a plurality of freely flexible linked triturating chains secured at both their ends to the outside of such support.

3. A machine for triturating or crushing materials in pieces or to powder, comprising a revolving drum; a plurality of chains each secured by its ends in loop form to the outside of said drum; and a casing surrounding said drum and chains.

4. A machine for triturating or crushing materials in pieces or to powder, comprising a revolving drum; a plurality of chains each secured by its ends in spiral loop form to the outside of said drum; and a perforated casing surrounding said drum and chains and adapted to be almost contacted by the chains.

5. In a machine for triturating or crushing materials, the combination of a horizontal cylindrical perforated casing; a rotatable drum co-axial therein and approximately half the diameter of the casing; and a plurality of freely flexible looped chains each having both ends separated from each other and fixed to the outer face of the drum and extending almost into contact with the casing.

6. In a machine for triturating or crushing materials, the combination of a horizontal cylindrical perforated casing; a rotatable drum co-axial therein and approximately half the diameter of the casing; and a plurality of freely flexible looped chains each having both ends separated from each other and fixed to the outer face of the drum, formed into sheets of mail and extending almost into contact with the casing.

7. In a machine for triturating or crushing materials, the combination of a horizontal cylindrical perforated casing; a rotatable drum co-axial therein and approximately half the diameter of the casing; and a plurality of freely flexible looped chains each having both ends separated from each other and fixed to the outer face of the drum, disposed in spiral fashion around the drum formed into sheets of mail and extending almost into contact with the casing.

In testimony, that we claim the foregoing as our invention, we have signed our names in presence of two subscribing witnesses.

RAOUL BRIFFAUX.
EUGÈNE BRISSON-DAUTHEL.
AMÉDÉE GILLOT.

Witnesses:
  H. C. COXE,
  MAURICE ROUX.

Copies of this patent may be obtained for five cents each, by addressing the "Commissioner of Patents, Washington, D. C."